United States Patent [19]

Heilala

[11] Patent Number: 4,838,560
[45] Date of Patent: Jun. 13, 1989

[54] SLIDE RING SEAL

[75] Inventor: Antti-Jussi Heilala, Starnberg, Fed. Rep. of Germany

[73] Assignee: Oy Safematic Ltd., Muurame, Finland

[21] Appl. No.: 97,444

[22] Filed: Sep. 16, 1987

[30] Foreign Application Priority Data

Oct. 8, 1986 [FI] Finland .................................. 864068

[51] Int. Cl.4 ............................................. F16J 15/38
[52] U.S. Cl. ...................................... 277/42; 277/63; 277/65; 277/87; 277/88; 277/93.50
[58] Field of Search ...................... 277/88, 89, 90, 93 R, 277/93 SD, 92, 61, 63, 65, 38, 85, 87, 40, 41, 42, 43

[56] References Cited

U.S. PATENT DOCUMENTS

| 1,363,378 | 12/1920 | Vuilleumier | 277/93 SD X |
|---|---|---|---|
| 1,802,813 | 4/1931 | Greenwald | 277/89 X |
| 1,850,571 | 3/1932 | Shively | 277/88 X |
| 2,192,426 | 3/1940 | Ames | 277/88 |
| 2,395,095 | 2/1946 | Brady, Jr. | 277/89 X |
| 2,467,960 | 4/1949 | Brady, Jr. | 277/37 |
| 2,590,759 | 3/1952 | Dale et al. | 277/93 X |
| 2,640,736 | 6/1953 | Wahlmark | 277/93 R X |
| 2,710,206 | 6/1955 | Huber | 277/93 R X |
| 2,912,265 | 11/1959 | Brummer | 277/88 X |
| 3,391,942 | 7/1968 | Wilson | 277/89 |
| 3,397,894 | 8/1968 | Mastriforte et al. | 277/88 X |
| 3,420,535 | 1/1969 | Hershey | 277/93 R X |
| 3,547,452 | 12/1970 | Hirata | 277/92 |
| 3,565,330 | 2/1971 | Latham, Jr. | 277/88 X |
| 3,658,349 | 4/1972 | Stevens et al. | 277/89 |
| 3,776,560 | 12/1973 | Wentworth, Jr. | 277/93 R X |
| 4,007,940 | 2/1977 | Chapa | 277/93 R X |
| 4,183,541 | 1/1980 | Wentworth, Jr. | 277/88 |
| 4,256,315 | 3/1981 | Larson et al. | 277/92 |
| 4,378,119 | 3/1983 | Luxford et al. | 277/88 |
| 4,424,973 | 1/1984 | Heilala . | |
| 4,560,173 | 12/1985 | Adams et al. | 277/65 X |
| 4,612,142 | 9/1986 | Heilala . | |
| 4,688,806 | 8/1987 | Heilala . | |
| 4,700,953 | 10/1987 | Kuusela . | |

FOREIGN PATENT DOCUMENTS

| 2501865 | 7/1975 | Fed. Rep. of Germany . | |
|---|---|---|---|
| 3106571 | 1/1982 | Fed. Rep. of Germany . | |
| 3141512 | 5/1983 | Fed. Rep. of Germany . | |
| 3446542 | 7/1986 | Fed. Rep. of Germany . | |
| 196242 | 8/1964 | Sweden | 277/90 |

Primary Examiner—Allan N. Shoap
Attorney, Agent, or Firm—Cushman, Darby & Cushman

[57] ABSTRACT

A slide ring seal for sealing a gap between a rotatable and non-rotatable machine part. The seal comprises at least one static seal ring to be attached to the non-rotatable machine part and provided with a slide ring and at least one counter ring to be fastened to the rotatable machine part and provided with a slide ring. The static seal ring and the counter ring are thereby arranged to be fastened in such a way that the slide surfaces of the slide rings are tightly pressed against each other. In order to simplify the structure of the seal the counter ring and the static seal ring are mutually replaceable sealing modules.

2 Claims, 2 Drawing Sheets

SLIDE RING SEAL

BACKGROUND OF THE INVENTION

The invention relates to a slide ring seal for sealing a gap between a rotatable and a non-rotatable machine part, comprising at least one static seal ring to be fastened to the non-rotatable machine part and provided with a slide ring and at least one counter ring to be attached to the rotatable machine part and provided with a slide ring, the static seal ring and the counter ring being arranged to be fastened so that the slide surfaces of the slide rings are pressed tightly against each other.

Slide ring seals are known from various technical fields. They are used, e.g., in gearboxes, pumps and other such devices to prevent liquid from leaking from the contact points between a rotatable machine part and an immovable machine part. There are two types of axially sealing slide ring seals. Single-acting seals comprise two rings rotating with respect to each other, one of which is attached to and sealed on the rotatable machine part and the other is attached to and sealed on the immovable machine part. The rings are pressed into sealing contact with each other by means of slide surfaces formed thereon. In single-acting slide ring seals, the lubrication is wholly carried out by means of a liquid to be pumped, wherefore single-acting seals are not suited for use with liquids that contain mechanically wearing particles. In their simplest form, double-acting seals are formed by two single-acting seals which define therebetween a space into which a separate sealing liquid is introduced, mainly for lubricating the slide surfaces of the rings rotating with respect to each other.

A disadvantage of prior known slide ring seals is that they are formed by several different parts, such as a body, a seal ring or seal rings, a counter ring or counter rings, a spring, springs or a bellow, auxiliary seals, etc. As a result of the great number of the requisite parts, the seal is complicated in structure, which complicates the storing of replacement parts, the production control and the assembly of the seals. Moreover, the complexity also often makes the seal unreliable, because, simultaneously as the number of parts increases, disturbances become more likely.

Known solutions include the slide ring disclosed in Finnish Patent Specification No. 61,558. This known seal solution comprises eight separate and dissimilar parts, excluding O-rings, screws and springs, namely a counter ring, a seal ring, a body, another seal ring, another counter ring, a supporting ring, a press ring and a flange. In addition to these parts, at least 8 to 10 O-rings, 9 to 10 screws and 10 to 20 separate springs are needed. Accordingly, 40 to 50 parts, of which 20 to 30 are unlike, have to be handled during the assembly of the seal.

Attempts have been made to achieve improvement in this matter by standardization, e.g. DIN 24960. Thereby, the counter rings, for instance, are made similar. The seal itself, however, may be very complicated.

SUMMARY OF THE INVENTION

The object of the invention is to provide a slide ring seal by means of which the disadvantages of the prior art can be eliminated. This is achieved by means of a slide ring seal according to the invention which is characterized in that the counter ring and the static seal ring are mutually replaceable sealing modules.

The invention is advantageous mainly in that the number of the different parts comprised in the seal will be reduced as compared with prior solutions. Thereby, the storing of replacement parts, the production control, as well as the assembly, are essentially simplified as compared with prior solutions. The assembly can thereby be automated in an advantageous manner and the production costs can be reduced.

BRIEF DESCRIPTION OF THE DRAWINGS

The invention will be described in the following in more detail by means of the preferred embodiments shown in the attached drawing, whereby.

DETAILED DESCRIPTION

Figure 1:
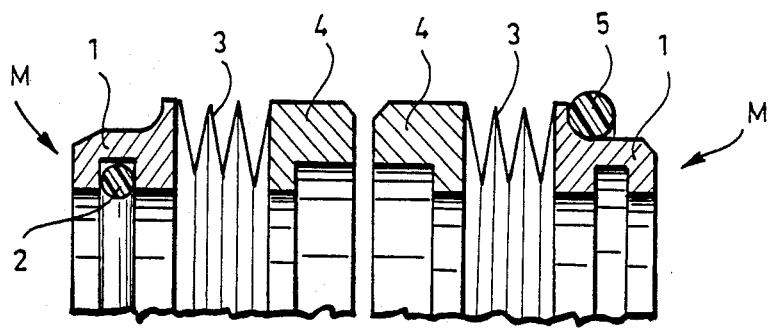
FIG. 1 is a general side view of the basic embodiment of the seal according to the invention.

FIG. 1 shows generally a slide ring seal intended for sealing a gap between a rotatable and non-rotatable machine part. For the sake of clarity, only the basic parts of the seal are shown in FIG. 1; accordingly, the non-rotatable machine part, such as the pump housing, and the rotatable machine part, such as the shaft, are not shown in the figure.

The slide ring seal is formed of, e.g., two seal rings in a conventional way by attaching a counter ring to the rotatable machine part and a static seal ring to the non-rotatable machine part so that the slide surfaces of the counter ring and those of the slide rings provided in the seal ring are tightly pressed against each other. The counter ring thus rotates with the rotatable machine part, and the static seal ring stays in place with respect to the non-rotatable machine part. These matters are completely obvious to one skilled in the art, so they are not more closely discussed here.

In the example of FIG. 1, the left-hand seal ring is arranged to act as a counter ring fitted on the rotatable machine part, and the right-hand seal ring correspondingly as a static seal ring to be fitted on the non-rotatable machine part.

According to the invention, the counter ring and the seal ring are mutually replaceable sealing modules. As appears from FIG. 1, the basic parts of the module include a fastening element 1 for fastening the seal either to the shaft or in a sealing space according to DIN 24960, a resilient element 3, in the example of FIG. 1 a metal bellows and, a slide ring 4. In FIG. 1, the module is indicated generally by the letter M.

As shown in FIG. 1, the modules M may be completely identical parts so that both modules M are resilient in the axial direction In addition to the basic parts of the modules M, O-rings 2 and 5 are shown in FIG. 1. When the module M is used as a counter ring to be fitted on the rotatable machine part, the O-ring 2 is positioned on the inner diameter of the module M. When the module M is used as a static seal ring to be fastened to the non-rotatable machine part, the O-ring 5 is positioned on the outer diameter of the module M.

An advantage of this solution is that the same module M can be used both as a counter ring and as a static seal ring.

Figure 2:
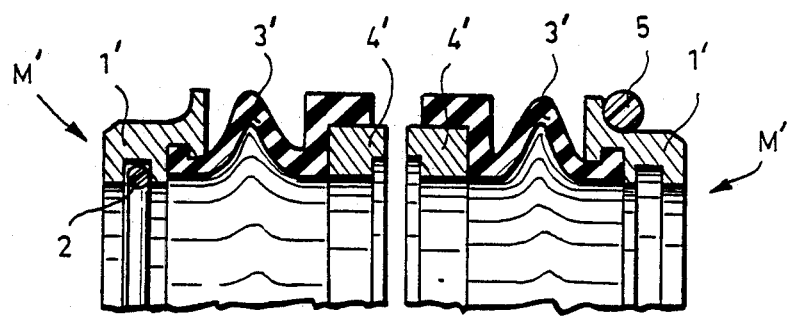
FIG. 2 is a general side view of another basic embodiment of the seal according to the invention.

The embodiment of FIG. 2 corresponds to that of FIG. 1. The only difference is that the resilient element 3' is formed by a rubber bellows. The module is indicated generally by the letter M' in FIG. 2. Apart from the resilient element 3' the module M' comprises a fastening element 1' and a slide ring 4'. The O-rings are indicated similarly as in FIG. 1.

Figure 3:
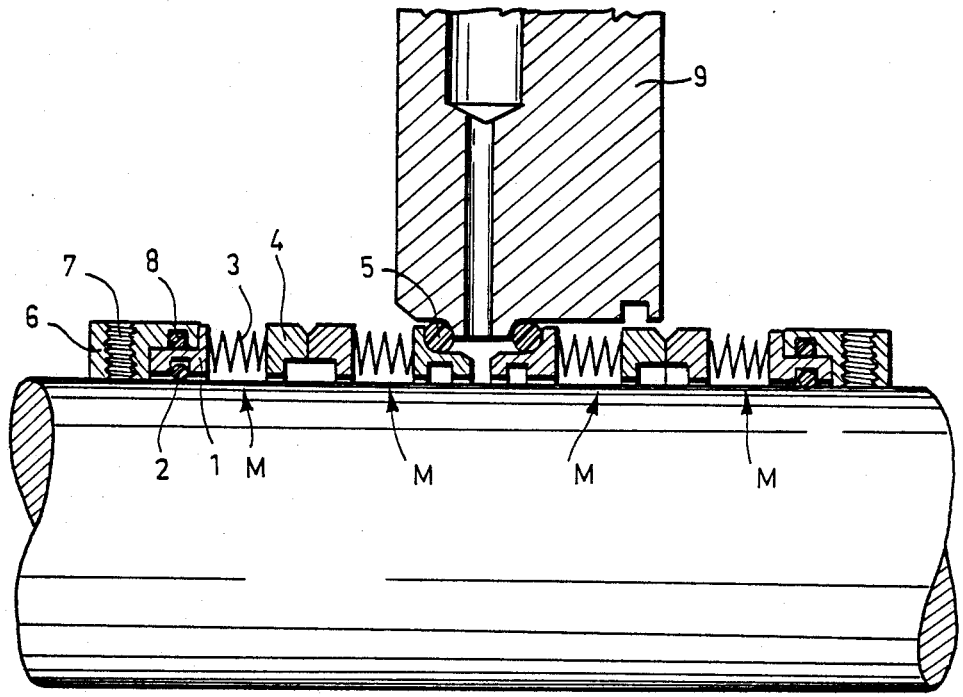
FIG. 3 is a general side view of a double-acting slide ring seal according to the invention.

Different kinds of modules can be assembled from the modules M, M' of the examples of FIG. 1 and 2 in various ways. FIG. 3 shows generally a double-acting slide ring seal when the modules M of FIG. 1 are used. The reference numerals of FIG. 3 correspond to those of FIG. 1. In FIG. 3, the reference numeral 6 further indicates a separate fastening module by means of which the module M can be fastened e.g. by means of a shaft or a separate sleeve. The reference numeral 7 indicates a fastening screw and the numeral 8 an O-ring which is fitted between the fastening module 6 and the module M. In FIG. 3, the reference numeral 9 indicates a stationary machine part, such as a part of the housing structure or the like, which is further provided with means for feeding a separate sealing liquid.

The operation of the slide ring seal of FIG. 3 corresponds to the operation of the seal of Finnish Patent Specification No. 61,558. The O-rings and screws and the like excluded, parts of three types only are required in the seal according to the invention to form the modules M. Similarly excluding the O-rings, screws, etc., the solution of Finnish Patent Specification No. 61,558 requires eight different parts.

The user and seller of the product, in particular, gain advantage from the small number of the different parts, because they can do with an extremely small store of replacement parts. Furthermore, repair operations can be carried out rapidly because of the simple replacement of a worn or damaged part with another. The manufacture, in turn, benefits from the module structure mainly in that it enables larger production series, thus reducing the production costs.

Figure 4:
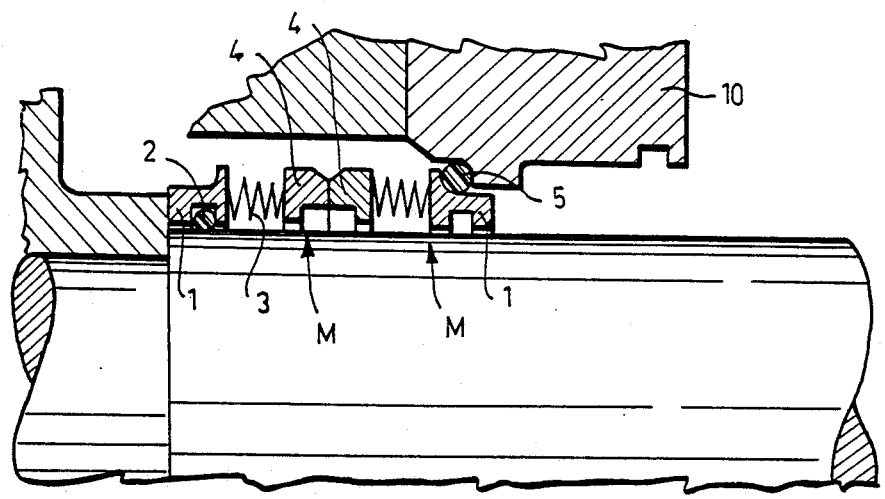
FIG. 4 is a general side view of a single-acting slide ring seal according to the invention.

FIG. 4 shows another embodiment in which a single-acting seal is assembled of the modules M. In addition to the sealing modules M, the figure shows generally a flange module 10. Accordingly, only two different modules are used in this example, i.e., the sealing module M and the flange module 10.

The embodiments described above are by no means intended to restrict the invention, but the invention can, of course, be modified within the scope of the claims in various ways. Accordingly, it is apparent that the modules can likewise be formed in a manner different form that disclosed in the examples. Also, the number of the modules in the seal can be rapidly chosen as required.

I claim:

1. A slide ring seal for sealing between a radially inner part which is rotatable about a longitudinal axis thereof and includes an outer circumferential surface having a radially outwardly projecting stop fixed thereon, and a non-rotatable radially outer part which spacedly surrounds at least a segment of the rotatable inner part and includes a radially inner circumferential surface having a sealing ring seat circumferentially provided in said inner circumferential surface at a site which is axially spaced from and faces said stop, said slide ring seal comprising:
two identical sealing modules, each including, arranged in a respective longitudinally extending series of engaged elements, from an axially outer end to an axially inner and;
(a) an annular fastening element,
(b) an annular axially resilient element, and
(c) an annular slide ring;
each said annular fastening element having a radially outwardly projecting circumferential flange providing an external sealing ring seat facing axially outwardly;
each said annular fastening element having a radially inwardly opening circumferential groove providing an internal sealing ring seat;
each said annular fastening element having an axially outwardly facing end surface adapted to act as a stop; and
each said annular slide ring having an axially inwardly presented annular sliding surface;
said two sealing modules being arranged with said annular sliding surfaces in sliding engagement with one another;
an external sealing ring received on said external sealing ring seat of said annular fastening element of one of said two sealing modules and arranged for sealing between said slide ring seal and said sealing ring seat provided in said inner circumferential surface of said non-rotatable outer part; and
an internal sealing ring received on said internal sealing ring seat of said annular fastening element of the other of said two sealing modules and arranged, when said stop of said other annular fastening element is engaged with said stop of said rotatable inner part and said annular axially resilient elements of both of said sealing modules are axially resiliently at least partially compressed between respective said annular fastening elements and annular slide rings, for sealing between said slide ring seal and said outer circumferential surface on said rotatable inner part.

2. A sealed connection, comprising:
a radially inner part which is rotatable about a longitudinal axis thereof and includes an outer circumferential surface having a radially outwardly projecting stop fixed thereon;
a non-rotatable radially outer part which spacedly surrounds at least a segment of the rotatable inner part and includes a radially inner circumferential surface having a sealing ring seat circumferentially provided in said inner circumferential surface at a site which is axially spaced from and faces said stop; and
a slide ring seal comprising:
two identical sealing modules, each including, arranged in a respective longitudinally extending series of engaged elements, from an axially outer end to an axially inner end:
(a) an annular fastening element,
(b) an annular axially resilient element, and
(c) an annular slide ring;
each said annular fastening element having a radially outwardly projecting circumferential flange providing an external sealing ring seat facing axially outwardly;
each said annular fastening element having a radially inwardly opening circumferential groove providing an internal sealing ring seat;
each said annular fastening element having an axially outwardly facing end surface adapted to act as a stop; and each said annular slide ring having an axially inwardly presented annular sliding surface;

said two sealing modules being arranged with said annular sliding surfaces in sliding engagement with one another;

an external sealing ring received on said external sealing ring seat of said annular fastening element of one of said two sealing modules and sealing between said slide ring seal and said sealing ring seat provided in said inner circumferential surface of said non-rotatable outer part; and an internal sealing ring received on said internal sealing ring seat of said annular fastening element of the other of said two sealing modules; said stop of said other annular fastening element being engaged with said stop of said rotatable inner part;

said annular axially resilient elements of both of said sealing modules being axially resiliently at least partially compressed between respective said annular fastening elements and annular slide rings; and said interanl sealing ring sealing between said slide ring seal and said outer circumferential surface on said rotatable inner part.

* * * * *